United States Patent Office 3,651,229
Patented Mar. 21, 1972

3,651,229
2-METHYL - 3-AMIDINO-QUINOXALINE-1,4-DI-N-OXIDES AS ANTIBACTERIAL AGENTS AND PHARMACEUTICAL COMPOSITIONS COMPRISING SAID OXIDES
Kurt Ley, Odenthal-Globusch, Ulrich Eholzer, Cologne-Stammheim, and Karl Georg Metzger, Wuppertal-Elberfeld, Germany (all % Farbenfabriken Bayer AG, Leverkusen, Germany), and Dieter Fritsche, Wuppertal-Vohwinkel, Germany (Lindenthal, Krielerstr 74, Cologne, Germany)
No Drawing. Original application Oct. 2, 1968, Ser. No. 764,612. Divided and this application Nov. 12, 1969, Ser. No. 871,282
Claims priority, application Germany, Oct. 4, 1967, F 53,668
Int. Cl. A61k 27/00
U.S. Cl. 424—250      19 Claims

ABSTRACT OF THE DISCLOSURE

Pharmaceutical compositions comprising 2-methyl-3-amidino-quinoxaline-1,4-di-N-oxides of the formula:

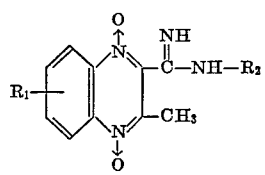

(I)

wherein:

$R_1$ is hydrogen, lower alkyl, lower alkoxy or chlorine, and
$R_2$ is hydroxy or amino, in combination with a pharmaceutically acceptable insert carrier are useful as antibacterial agents.

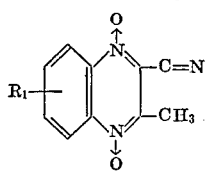

(II)

These compositions or the active compound can be administered subcutaneously or orally to humans and animals.

---

This is a division of our co-pending application Ser. No. 764,612, filed Oct. 2, 1968.

The present invention is concerned with 2-methyl-3-amidino-quinoxaline-1,4-di-N-oxides and their production. More particularly, these compounds can be represented by the formula:

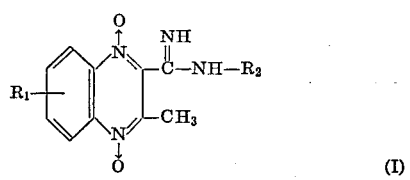

(I)

wherein:

$R_1$ is hydrogen, lower alkyl, lower alkoxy or chlorine, and
$R_2$ is hydroxy or amino.

These compounds are useful as antibacterial compounds.

The compounds of the present invention may be produced, inter alia, by reacting a 2-methyl-3-cyano-quinoxaline-1,4-di-N-oxide of the formula:

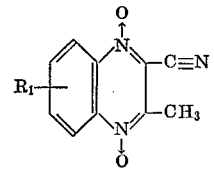

(II)

with a compound of the formula:

$R_2$—$NH_2$      (III)

in a suitable organic solvent at a temperature of from about 10° C. to about 80° C., preferably from about 20° C. to about 35° C.

According to the present invention, the preferred lower alkyl and lower alkoxy groups for $R_1$ are those containing 1 to 4 carbon atoms.

If 2-methyl-3-cyano-quinoxaline-1,4-di-N-oxide and hydroxyl-amine or 2-methyl-3-cyano-7-chloroquinoxaline-1,4-di-N-oxide and hydrazine are used as starting materials, the reaction of the invention can be represented by the following reaction mechanisms:

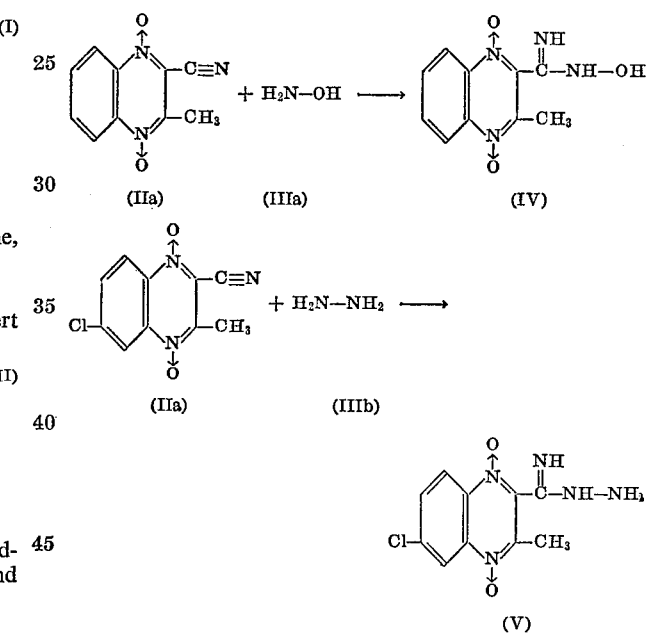

The 2-methyl-3-cyano-quinoxaline-1,4-di-N-oxides used as starting compounds for the process according to the invention may be obtained by reaction of benzofuroxan with 5-methyl-isoxazole.

Suitable starting compounds for the reaction according to the invention are:

2-methyl-3-cyano-quinoxaline-1,4-di-N-oxide,
2,7-dimethyl-3-cyano-quinoxaline-1,4-di-N-oxide,
2-methyl-3-cyano-7-chloro-quinoxaline-1,4-di-N-oxide,
2-methyl-3-cyano-7-methoxy-quinoxaline-1,4-di-N-oxide.

The process according to the invention is expediently carried out as follows:

One mole of the 2-methyl-3-cyano-quinoxaline-1,4-di-N-oxide is suspended in an organic solvent; there are then added, at room temperature, 1–3 moles, preferably 1.5–2 moles, of hydrazine (as hydrate) or hydroxylamine (if desired, in the form of a salt of a mineral acid with the addition of an acid-binding agent, for example, triethylamine). By stirring for several hours at 10° C.–80° C., preferably at 20° C.–35° C., the appropriate 2-methyl-3-amidino-quinoxaline-1,4-di-N-oxides are obtained as crystalline compounds.

As solvents, alcohols (preferably isopropanol), dimethyl formamide, acetonitrile, dioxan and tetrahydrofuran are preferably used.

Hydroxylamine is expediently added in the form of a salt with a mineral acid, e.g. as hydrochloride and liberated by addition of one mole of an acid-binding agent, for example triethylamine.

Hydrazine may also expediently be used in the form of its hydrate. Aqueous hydrazine solutions with a water content of up to about 90% can also be used.

The antibacterial activity of the compounds of the present invention has been demonstrated both in vitro and in vivo and the compounds of the present invention have, in such tests, shown utility upon both subcutaneous as well as oral administration against acute bacterial infections. The compounds are effective against a range of both gram positive and gram negative bacteria.

The general dosage ranges of the compounds of the present invention are from about 5 mg. to about 150 mg. and preferably from about 25 mg. to about 150 mg./kg. per body weight per day. It is, however, to be appreciated that in some cases it may be necessary or desirable to administer a greater or lesser amount, which amount will be dependent upon the type of infection, the severity of the condition, the body weight of the human or animal involved, the past medical history and other factors generally taken into consideration by those administering antibacterial compounds. In the case where larger amounts are administered, it is generally advisable to divide these larger dosages into several smaller doses which may be administered during the course of the day.

The compounds of the present invention may be used either as such or may be administered in combination with known pharmaceutically acceptable carriers and diluents. Suitable as administration forms in combination with various inert carriers and diluents for the compounds of the present invention are tablets, capsules, powders, sprays, elixirs, aqueous suspensions, injectable solutions, syrups and the like. The carriers and diluents also include fillers and sterile aqueous media, as well as non-toxic organic solvents and other suitable pharmaceutical vehicles well known by those in the art. If desired, tablets, capsules or other forms used for oral administration may be provided with a sweetening additive or other suitable flavoring substance. The compounds of the present invention, which is the active ingredient in such a pharmaceutical composition, should be present in a concentration of from about 0.5 to about 90% by weight of the total composition.

For oral administration, tablets may also contain such known additives as sodium citrate, calcium carbonate, dicalcium phosphate, together with various adjuvants such as starch, preferably potato starch, and the like, and binders such as polyvinylpyrrolidine, gelatin and the like, lubricants such as magnesium stearate, sodium lauryl sulphate and talc may also be used for table-making. For aqueous suspensions and/or elixirs which are intended for oral administration, suitable substances to improve the taste, dyestuffs, emulsifiers and/or diluents, such as water, ethanol, propylene glycol, glycerol and the like, may be added.

For solutions intended for parenteral application, the compound of the present invention may be combined with sesame oil or arachis oil or aqueous propylene glycol or N,N-dimethyl formamide may be used, as well as sterile aqueous solutions when water soluble compounds are utilized. If necessary, such aqueous solutions can be buffered in known and customary manner and the liquid diluents should be rendered isotonic beforehand by the addition of the requisite amount of salt or glucose. Such aqueous solutions are particularly suitable for intravenous, intramuscular and intraperitoneal injections. Sterile aqueous media may be prepared in manners per se known in the art.

The following data shows the effectiveness of compounds selected as representative of the class as a whole and the number of the compounds tested corresponds to the example number. These tests demonstrate the effectiveness of representative species and the genus as a whole embraces compounds having antibacterial activity already indicated.

In the animal experiments with white mice, the intraperitoneally infected animals were treated subcutaneously or orally as follows:

(1) Administration in one dose, subcutaneously or orally, of 1000 mg., 500 mg., 200 mg., 50 mg., 25 mg., 12.5 mg. or 6.25 mg./kg. 15 minutes before or 90 minutes after infection.

(2) Administration in two (or three) doses of 6.25 mg., 12.5 mg., 25 mg., 50 mg. or 150 mg./kg. two hours before and five hours after infection.

(3) Administration of four doses of 50 mg. or 150 mg./kg. two hours before infection, shortly before infection, 3 hours, 5 hours and/or 21 hours and 29 hours after infection.

The bacteria used for infections were *E. coli*, *Klebsiella*, *Staphylococcus aureus*, *Dipplococcus pneumoniae* or *Streptococcus pyogenes*, *Proteus mirabilic* and *Pseudomonas aeruginosa*. The $ED_{100}$ of the most effective compounds (e.g., 1, 2, 4) against *E. coli* C165 lies, in the case of administration of one dose, orally or subcutaneously between 5 mg./kg. and 100 mg./kg.

The $DL_{50}$ lies in the dosage range of about 400 mg./kg. to about 2500 mg./kg. after oral administration in one dose to mice. The substances are thus relatively non-toxic since the relatively less well tolerated ones are distinguished by higher effectiveness and are, therefore, applied only in low dosage. Also in the case of treatment of rats with 60 mg./kg. orally twice daily over two weeks, the substances were well tolerated. In the case of acute ascending infections of the urinary tract of the rat (pyclonephritis), dosages of 2×15 mg./kg. daily, i.e., 15 mg./kg. twice a day, over 7–10 days were applied with success and were tolerated well. In vitro, the substances act bacteriostatically and bactericidally.

The new compounds are also effective against Mycoplasma infections in the in vitro test, amounts of about 5 to about 50γ per ml. being used.

| (1) Compound (Example number) | Infection germ [1] | Animal experiments with the white mouse Percent surviving animals [2] |
|---|---|---|
| 1 | a=1×25 | 100 |
|   | b=1×100 | 100 |
| 2 | a=1×100 | 100 |
|   | b=2×200 | 100 |
| 4 | a=1×100 | 100 |
|   | b=1×100 | 100 |
| 5 | a=1×100 | 100 |
|   | b= | |
|   | Klebsiella 1×100 | 100 |

[1] a=*E. coli*; b=*Staph. aureus*. Doses mg./kg. oral or subcutaneous.
[2] 24 hours after infection.

| (2) Bacterium | Inhibition values in vitro: Minimum inhibition conc. in μg./ml., nutrient medium | | | |
|---|---|---|---|---|
|  | 1 | 2 | 4 | 5 |
| a | 10-100 | 10-100 | 10-100 | 50-100 |
| b | 10 | 100 | 50 | 50-100 |
| c | 50-100 | 100 | 100 | 150 |
| d | 10-100 | 10-100 | 10-50 | 100 |
| e | 100 | 150 | 150 | 150 |
| f | 100 | 100 | 150 | 150 |

NOTE.—a=*E. coli*; b=Proteus sp., c=*Pseudomonas aerug.*; d=Klebsiella sp., e=*Staph. aureus*; f=*Streptococcus pyog*.

The preparation of the compounds of the present invention is illustrated by the following examples.

EXAMPLE 1

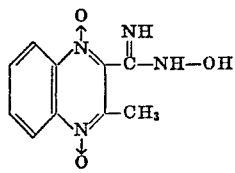

(VI)

40 g. (0.2 mole) 2-methyl-3-cyano-quinoxaline-1,4-di-N-oxide are suspended in 200 ml. dimethyl formamide, 28 g. (0.4 mol) hydroxylammonium hydrochloride are added, and 40.4 g. (0.4 mole) triethylamine are added dropwise at 20° C.–25° C., with slight cooling. Stirring is continued for 4 hours at 25° C., the yellow crystals are filtered off with suction, washing with cold water in order to remove the triethylene hydrochloride is effected, followed by recrystallization from hot water. 30 g. (=65% of the theory) of 2-methyl-3-N-hydroxyamidino-quinoxaline-1,4-di-N-oxide are obtained as yellow crystals which melt at 212° C., with decomposition.

Analysis.—$C_{10}H_{10}N_4O_3$ (molecular weight 234): Calc. (percent): C, 51.3; H, 4.71; N, 23.95. Found (percent): C, 51.0; H, 4.6; N, 23.7.

EXAMPLE 2

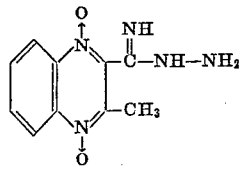

(VII)

100.5 g. (0.5 mole) 2-methyl-3-cyano-quinoxaline-1,4-di-N-oxide are suspended in 500 ml. dimethyl formamide, and 100 g. (2 moles) hydrazine hydrate are added dropwise at 20° C.–25° C. Stirring is continued for 4 hours at 25° C., followed by cooling and the yellow crystals are filtered off with suction. After recrystallization from dimethyl formamide, 43 g. (37% of the theory) of 2-methyl - 3-hyrazidino-quinoxaline-1,4-di-N-oxide are obtained as pale brown needles which melt at 191° C., with decomposition.

Analysis.—Calc. (percent): $C_{10}H_{11}N_5O_2$ (molecular weight 233); C, 51.5; H, 4.72; N, 30.10. Found (percent): C,51.8; H, 4.8; N, 29.9.

The 2 - methyl - 3-cyano-quinoxalino-di-N-oxide-1.4) used as starting compound was obtained as follows:

492 g. (3.62 moles) of benzofuroxan are suspended in 1000 ml. methanol. 204 g. (3.8 moles) ammonium chloride are added, and 2 to 3 moles of ammonia are introduced at 20 to 30° C. Into this suspension is added dropwise, with stirring and further slow introduction of ammonia without supply of heat, a solution of 393 g. of an isomeric mixture of 70% by weight of 5-methylisoxazole and 30% of 4-methylisoxazole (corresponding to 3.31 moles of 5-methylisoxazole) in 250 ml. methanol, which solution had previously been heated to 50 to 55° C. for 30 minutes with a solution of 186 g. (3.31 moles) of potassium hydroxide in 1.5 l. of methanol.

When the benzofuroxan is added, the mixture heats up to 45° C. After subsidence of the heat effect, heating to 40° C. to 45° C. is effected for a further 4 hours. During the reaction, the benzofuroxan dissolves, the reaction product separates in yellow crystals. Suction filtration is effected, followed by washing with water and methanol, and drying. 572 g.=86% of the theory (with a reference to 5 - methylisoxazole) of 2-methyl-3-cyanoquinoxaline-1,4-di-N-oxide are obtained as yellow crystals which, after recrystallization from acetonitrile, melt at 194° C. with decomposition.

TABLE

| Ex. No. | Formula | M.P. in °C. | Appearance |
|---|---|---|---|
| 3 | (VIII) | 206 (d) | Yellow crystals. |
| 4 | (IX) | 215 (d) | Do. |
| 5 | (X) | 256 (d) | Do. |
| 6 | (XI) | 215 (d) | Pale-brown crystals. |

NOTE.—(d)=decomposition.

The other compounds, that is, those whose formulas are set forth as Examples 3 through 6 are prepared in a similar manner by reacting, respectively:

2-methyl-3-cyano-1-chloro-quinoxaline-1,4-di-N-oxide with hydroxylammonium hydrochloride;
2-methyl-3-cyano-7-methyl-quinoxaline-1,4-di-N-oxide with hydroxylammonium hydrochloride;
2-methyl-3-cyano-7-methoxy-quinoxaline-1,4-di-N-oxide with hydroxylammonium hydrochloride;
2-methyl-3-cyano-7-chloro-quinoxaline-1,4-di-N-oxide with hydrazine hydrate.

The starting materials set forth above may be obtained in a manner similar to that described with reference to the compounds of Examples 1 and 2.

In addition to the new compounds and processes disclosed herein, the present invention also includes pharmaceutical compositions containing at least one compound of the present invention in combination or admixture with a solid or liquid diluent or carrier, as well as methods of treating bacterial infections. The present invention also includes unit dosage forms comprising at least one compound of the present invention either alone or in admixture or combination with a solid or liquid diluent or carrier. The compound may be suitably enveloped by a protective covering containing the compound itself and, if used, a diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

What is claimed is:

1. An antibacterial pharmaceutical composition which comprises an antibacterial effective amount of a compound of the formula:

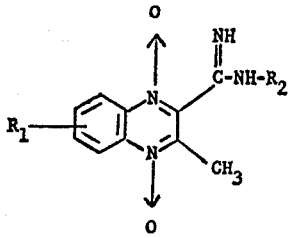

wherein

R₁ is hydrogen, lower alkyl, lower alkoxy or chlorine and

R₂ is hydroxy or amino in combination with a pharmaceutically acceptable non-toxic inert diluent or carrier.

2. An antibacterial pharmaceutical composition according to claim 1 wherein the compound is of the formula:

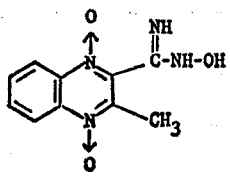

3. An antibacterial pharmaceutical composition according to claim 1 wherein the compound is of the formula:

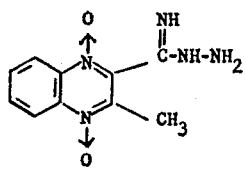

4. An antibacterial pharmaceutical composition according to claim 1 wherein the compound is of the formula:

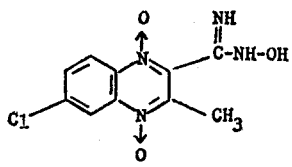

5. An antibacterial pharmaceutical composition according to claim 1 wherein the compound is of the formula:

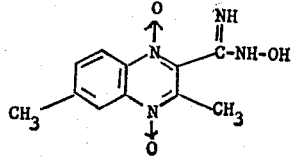

6. An antibacterial pharmaceutical composition according to claim 1 wherein the compound is of the formula:

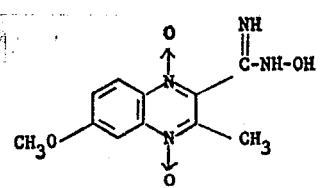

7. An antibacterial pharmaceutical composition according to claim 1 wherein the compound is of the formula:

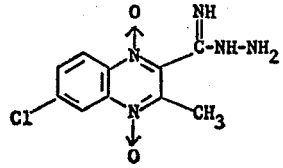

8. An antibacterial pharmaceutical composition according to claim 1 in oral administration form.

9. An antibacterial pharmaceutical composition according to claim 1 in parenteral administration form.

10. A method of treating bacterial infections in humans and animals which comprises administering an antibacterial effective amount of a compound of the formula:

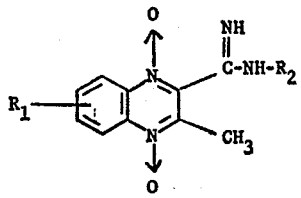

wherein

R₁ is hydrogen, lower alkyl, lower alkoxy or chlorine and

R₂ is hydroxy or amino until amelioration of the condition occurs.

11. A method of treatment according to claim 10 wherein from 5 mg./kg. to 150 mg./kg. is administered.

12. A method of treatment according to claim 10 wherein the compound is of the formula:

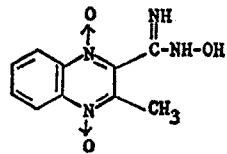

13. A method of treatment according to claim 10 wherein the compound is of the formula:

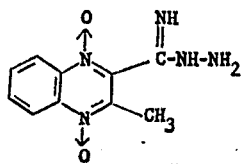

14. A method of treatment according to claim 10 wherein the compound is of the formula:

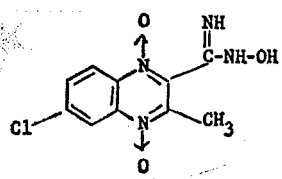

15. A method of treatment according to claim 10 wherein the compound is of the formula:

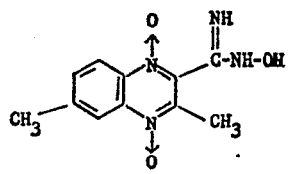

16. A method of treatment according to claim 10 wherein the compound is of the formula:

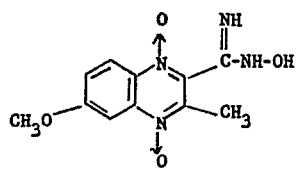

17. A method of treatment according to claim 10 wherein the compound is of the formula:

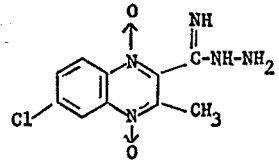

18. A method of treatment according to claim 10 wherein the administration is oral.

19. A method of treatment according to claim 10 wherein the administration is parenteral.

References Cited
UNITED STATES PATENTS
3,157,654  11/1964  Sasse et al. _____ 424—250

JEROME D. GOLDBERG, Primary Examiner

PO-1050
(5/69)

UNITED STATES PATENT OFFICE
CERTIFICATE OF CORRECTION

Patent No. 3,651,229      Dated March 21, 1972

Inventor(s) Kurt Ley et al

It is certified that error appears in the above-identified patent and that said Letters Patent are hereby corrected as shown below:

In the heading insert -- assignors to Farbenfabriken Bayer Aktiengesellschaft, Leverkusen, Germany, a corporation of Germany --

Signed and sealed this 17th day of April 1973.

(SEAL)
Attest:

EDWARD M. FLETCHER, JR.
Attesting Officer

ROBERT GOTTSCHALK
Commissioner of Patents